(12) United States Patent
Lee

(10) Patent No.: US 10,319,348 B2
(45) Date of Patent: Jun. 11, 2019

(54) MEMORY SUBSYSTEM CONSUMER TRIGGER

(71) Applicant: ViXS Systems, Inc., Toronto (CA)

(72) Inventor: Brian Lee, Markham (CA)

(73) Assignee: VIXS SYSTEMS, INC., Toronto (CA)

( * ) Notice: Subject to any disclaimer, the term of this patent is extended or adjusted under 35 U.S.C. 154(b) by 76 days.

(21) Appl. No.: 14/853,106

(22) Filed: Sep. 14, 2015

(65) Prior Publication Data

US 2016/0335735 A1 Nov. 17, 2016

Related U.S. Application Data

(60) Provisional application No. 62/159,667, filed on May 11, 2015.

(51) Int. Cl.
*G06T 1/20* (2006.01)
*G09G 5/393* (2006.01)
(Continued)

(52) U.S. Cl.
CPC .............. *G09G 5/393* (2013.01); *G09G 5/001* (2013.01); *H04N 21/435* (2013.01); *G06F 3/14* (2013.01);
(Continued)

(58) Field of Classification Search
CPC ... G06T 1/20; G06T 1/60; G06T 2207/10016; G06F 3/14; G06F 12/023; G06F 12/0246; G06F 12/04; G06F 19/22; G06F 1/3206; G06F 11/2069; G06F 17/30958; G06F 17/30303; G06F 17/30371; G06F 9/4881; G06F 3/064; G06F 3/0659; G06F 12/0607; G06F 2212/401; G09G 5/393; G09G 5/001; G09G 2340/02; G09G 2350/00; G09G 2360/06; G09G 2360/10; G09G 2360/08; H04N 19/60; H04N 19/593; H04N 19/182; H04N 19/137; H04N 19/176; H04N 13/0048; H04N 19/52; H04N 19/105; H04N 19/11; H04N 19/157; H04N 19/172;
(Continued)

(56) References Cited

U.S. PATENT DOCUMENTS 7,728,841 B1 6/2010 Nordquist
8,781,000 B2 7/2014 Girardeau, Jr. et al.
(Continued)

*Primary Examiner* — Xilin Guo
(74) *Attorney, Agent, or Firm* — Miller Nash Graham & Dunn LLP

(57) ABSTRACT

A technique includes writing first processed data to a buffer. The first processed data is generated in response to execution of a first subtask of a pipelined task on first data. The technique includes writing command information to the buffer. The command information is appended to the first processed data and is associated with execution of a second subtask of the pipelined task on second processed data. The technique includes executing the second subtask on the second processed data according to the command information received from the buffer at a conclusion of execution of the second subtask on the first processed data. The technique may include executing the first subtask based on the first data to generate the first processed data. Executing the second subtask may include triggering execution of an execution unit in response to the command information.

19 Claims, 4 Drawing Sheets

(51) Int. Cl.
  *G09G 5/00* (2006.01)
  *H04N 21/435* (2011.01)
  *G06F 3/14* (2006.01)

(52) U.S. Cl.
  CPC ..... *G09G 2340/02* (2013.01); *G09G 2350/00* (2013.01); *G09G 2360/06* (2013.01); *G09G 2360/08* (2013.01); *G09G 2360/10* (2013.01)

(58) Field of Classification Search
  CPC .... H04N 19/46; H04N 19/103; H04N 19/132; H04N 19/436; H04N 19/44; H04N 19/463; G06Q 10/0633; G06N 5/045; G06N 5/046; G06K 9/4604; G06K 2009/00738; H04L 1/0071; H04L 1/0057; H04L 69/22; H04L 1/0009; H04L 1/08
  See application file for complete search history.

(56) References Cited

U.S. PATENT DOCUMENTS

| | | | | |
|---|---|---|---|---|
| 2005/0141772 A1* | 6/2005 | Okada | ............. | H04N 19/60 |
| | | | | 382/238 |
| 2007/0115964 A1* | 5/2007 | Srinivasan | ............. | H04L 47/10 |
| | | | | 370/389 |
| 2012/0102295 A1* | 4/2012 | Yang | ............. | G06F 12/023 |
| | | | | 711/206 |
| 2012/0170667 A1* | 7/2012 | Girardeau, Jr. | ............. | H04N 7/50 |
| | | | | 375/240.25 |
| 2013/0003871 A1* | 1/2013 | Bjontegaard | ............. | H04N 19/176 |
| | | | | 375/240.29 |
| 2014/0022266 A1 | 1/2014 | Metz | | |
| 2016/0014421 A1* | 1/2016 | Cote | ............. | H04N 19/196 |
| | | | | 382/170 |
| 2016/0189681 A1 | 6/2016 | White | | |

* cited by examiner

MEMORY SUBSYSTEM CONSUMER TRIGGER

CROSS-REFERENCE TO RELATED APPLICATION(S)

This application claims benefit under 35 U.S.C. § 119(e) of provisional application 62/159,667 filed May 11, 2015, entitled "MEMORY SUBSYSTEM CONSUMER TRIGGER", naming Brian Lee as inventor, which application is incorporated herein by reference.

BACKGROUND

Field of the Invention

This application is related to data processing systems and more particularly to pipelined data processing systems.

Description of the Related Art

A typical video data processing system includes a video system on a chip (SoC) integrated circuit including multiple video processing blocks and related hardware. The video SoC receives compressed video data and decompresses (i.e., decodes, uncompresses, or expands) the compressed video data to recover uncompressed (i.e., raw) video data. The video SoC writes the uncompressed video data to a buffer or a system memory for subsequent use by one or more video processing blocks. The one or more video processing blocks retrieve the uncompressed video data from the buffer or system memory and may write processed, uncompressed video data to another buffer or other portion of system memory. In general, a still video image or frame includes R×C pixels (e.g., 1920×1080 pixels for an exemplary high-definition video screen) and each pixel may be represented by multiple bytes of data. A video processing block reads a frame, or portions of a frame of video data from a buffer or the system memory, processes the video data, and, in some cases, writes the processed video data to another buffer or back to the system memory.

SUMMARY OF EMBODIMENTS OF THE INVENTION

In at least one embodiment of the invention, a method includes writing first processed data to a buffer. The first processed data is generated in response to execution of a first subtask of a pipelined task on first data. The method includes writing command information to the buffer. The command information is appended to the first processed data and is associated with execution of a second subtask of the pipelined task on second processed data. The method includes executing the second subtask on the second processed data according to the command information received from the buffer at a conclusion of execution of the second subtask on the first processed data. The method may include executing the first subtask based on the first data to generate the first processed data. Executing the second subtask may include triggering execution of an execution unit in response to the command information. Executing the second subtask may include configuring an execution unit associated with the second subtask based on the command information. The command information may include configuration information and trigger information. The first processed data and the second processed data may be associated with adjacent fundamental blocks of a video frame. The configuration information may include boundary information for the adjacent fundamental blocks of the video frame.

In at least one embodiment of the invention, an apparatus includes a first execution unit configured to write first processed data and command information to a buffer. The first processed data is generated by execution of a first subtask of a pipelined task on first data to a buffer. The command information is associated with execution of a second subtask on second processed data and is appended to the first processed data in the buffer. The apparatus includes a second execution unit coupled in series with the first execution unit and configured to execute in parallel with the first execution unit. The second execution unit is further configured to execute a second subtask of the pipelined task on the first processed data and further configured to execute the second subtask on second processed data according to the command information read from the buffer at a conclusion of execution of the second subtask on the first processed data. The command information may include configuration information and trigger information. The apparatus may include the buffer configured to store the first processed data and the trigger information. The first processed data and the second processed data may be associated with adjacent fundamental blocks of a video frame and the configuration information may include boundary information for the adjacent fundamental blocks of the video frame.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
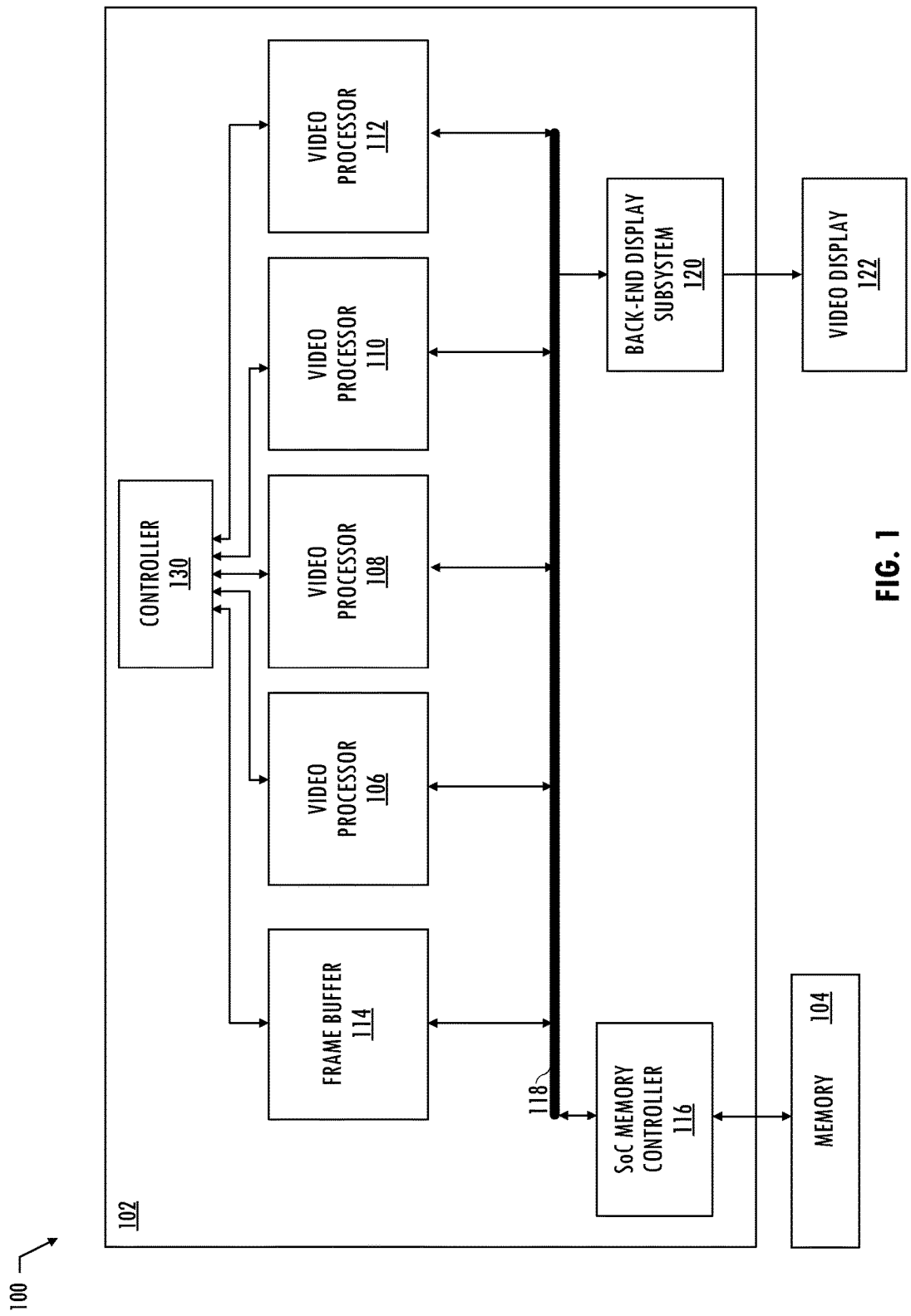
FIG. 1 illustrates a functional block diagram of an exemplary pipelined video processing system.

Referring to FIG. 1, a typical video data processing system includes system memory 104 and a video system-on-a-chip (SoC) 102, which includes memory controller 116 and multiple video processing circuits and associated circuits coupled in a pipeline. Video SoC 102 receives compressed video data from memory 104 using memory controller 116. Memory controller 116 provides the video data to temporary on-chip storage (e.g., frame buffer 114 or other buffers (not shown)) and/or to one or more video processing circuits (e.g., video processors 106, 108, 110, and 112). The video processing modules may decompress (i.e., decode, uncompress, or expand) the compressed video data to recover uncompressed (i.e., raw) video data. Video SoC 102 may write uncompressed video data to system memory 104 for subsequent use by one or more of video processors 106, 108, 110, and 112. Video processors 106, 108, 110, and 112 are execution units coupled in series for parallel execution, i.e., are execution units configured for pipelined operation controlled by controller 130. The output of one video processor (e.g., video processor 106) is the input for a next video processor (e.g., video processor 108) in the pipeline. The outputs are typically buffered between execution units. Video SoC 102 may include buffers on-chip or the outputs may be written and read from external buffers in memory 104. One or more video processing modules retrieve video data from frame buffer 114, another on-chip buffer, or from memory 104, perform bit-rate reduction, resolution change, and/or format conversion, and may write processed video data to frame buffer 114, another on-chip buffer, or memory 104, and/or provide the processed video data to backend display subsystem 120 for processing and output to video display 122.

Due to the large quantity of data involved, only small quantities of video data may be available to a particular video processor circuit at a particular time. Only an individual frame or a portion of an individual frame may be available for access by a particular video processor from frame buffer 114 or SoC memory controller 116. System-on-a-chip memory controller 116 reads the video data from system memory and stores it in frame buffer 114 for processing and, in some cases, SoC memory controller 116 writes processed data back to memory 104. Video SoC 102 may include a front-end display subsystem that receives video data and generates uncompressed and/or processed video data in a form usable by the back-end subsystem. Typical front-end display subsystem operations include decoding, decompression, format conversion, noise reduction (e.g., temporal, spatial, and mosquito noise reduction) and other interface operations for video data having different formats (e.g., multiple streams). Back-end display subsystem 120 delivers the uncompressed video data to a display device (e.g., video display 122, projector, or other electronic device).

Figure 2:
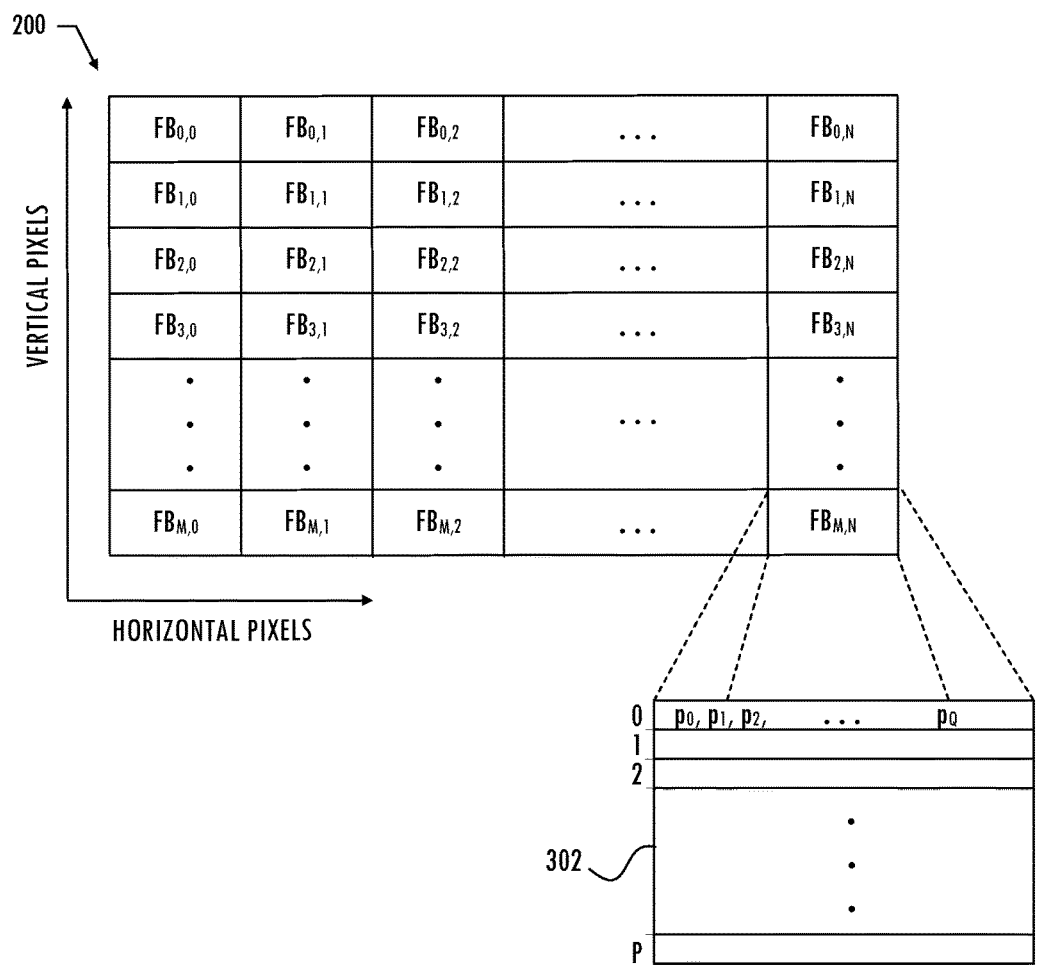
FIG. 2 illustrates an exemplary video data format of a frame of a still video image.

Referring to FIG. 2, in at least one embodiment of video SoC 102, the compressed video data received from system memory 104 or other external source is compressed using a high compression rate video data compression technique (e.g., MPEG-2) that partitions a frame of a video image (e.g., frame 200) into M rows and N columns of fundamental blocks (e.g., macroblocks) of pixels. An individual fundamental block is represented by $FB_{m,n}$, where m indicates a particular row of the M rows of fundamental blocks of frame 200 and n indicates a particular column of the N columns of fundamental blocks of frame 200. In at least one embodiment of video SoC 102, each fundamental block (e.g., fundamental block 202) includes a P×Q block of pixel data (i.e., each fundamental block includes P lines of Q pixels, e.g., a 16×16 block of pixel data). Each row of the fundamental block includes pixels forming a portion of a line of a frame of a video image.

For example, where the number of fundamental blocks that span a line of a frame of the video image is N, each row of a fundamental block includes a line portion of pixels forming 1/Nth of a line of the frame of the video image. Video processor 106 may operate on the video data in a non-linear manner, i.e., not line-by-line of the frame of the video image. In at least one embodiment, video processor 106 operates on fundamental blocks of the frame of the video image, and provides the uncompressed video data in a tiled format (i.e., fundamental block by fundamental block of uncompressed video data). In at least one embodiment, video processor 106 writes one fundamental block at a time, from left-to-right, top-to-bottom of a frame of a video image, with pixels within the block being written in a linear order. However, note that each fundamental block may include video data corresponding to multiple lines. In addition, note that tiling formats and fundamental block sizes may vary with different high-compression rate video compression techniques and decoders compliant with different video compression standards.

Figure 3:
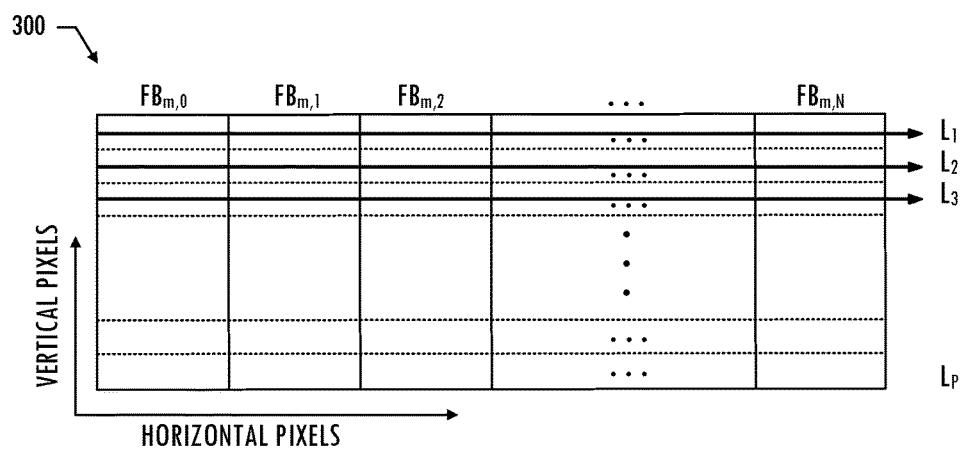
FIG. 3 illustrates an exemplary video data format of a fundamental block of a frame of a still video image of FIG. 2.

Referring to FIGS. 1 and 3, in at least one embodiment of video SoC 102, video processors 108 and 110 may process video data in a linear manner, i.e., read or operate on frames of a video image line-by-line. In one row of fundamental blocks of a frame of a video image (e.g., row 300) the number of lines read and processed can be unrelated to the size of the fundamental block. For example, an exemplary video processor may operate on three lines of that row of fundamental blocks at a time (e.g., $L_1, L_2, L_3$). However, the row of fundamental blocks includes P lines of video data (e.g., $L_1, L_2, L_3, \ldots, L_P$) and each fundamental block includes P line portions corresponding to the P lines of video data (e.g., $I_{m,n,1}, I_{m,n,2}, I_{m,n,3}, \ldots, I_{m,n,P}$), where m indicates a row of fundamental blocks of a frame of a video image and n indicates a column of fundamental blocks of the screen image. The exemplary video processing block reads and processes one or more lines of video data, each line including portions of video data from multiple fundamental blocks that span a row of a frame of a video image (e.g., each line spans N fundamental blocks). Note that in at least one embodiment, an exemplary video processor reads and processes a number of lines that is not a multiple of the number of lines included in a fundamental block. Accordingly, when the video processor reads multiple lines, those lines may span multiple fundamental blocks of a frame of a video image in different rows of the frame of the video image (i.e., spanning vertically adjacent portions of the frame of the video image). The above-described disparity between the order in which an embodiment of video processor 106 produces video data and the order in which video processors 108 and 110 consume the video data may increase the complexity of processing video data.

Referring back to FIG. 1, as described above, video processors 106, 108, 110, and 112 are execution units configured for pipelined operation. The output of one video processor, referred to herein as a producer execution unit, is the input of a next video processor, referred to herein as a consumer execution unit, in the pipeline. A consumer execution unit may be any of the processor modules that accesses video data from a buffer or memory system (e.g., a memory system including SoC memory controller 116 and memory 104) and processes those data. For example, each of frame buffer 114, video processor 106, 108, 110, and 112, and back-end display subsystem 120 may access video data from a buffer or memory system, and then processes those data. A producer execution unit may be any of the processor modules that provides processed data to a buffer, the memory system, or otherwise outputs those processed data (e.g., to video display 122). Note that any particular execution unit (e.g., any of video processor 106, 108, 110, and 112, and back-end display subsystem 120) may be both a consumer execution unit and a producer execution unit.

Figure 4:
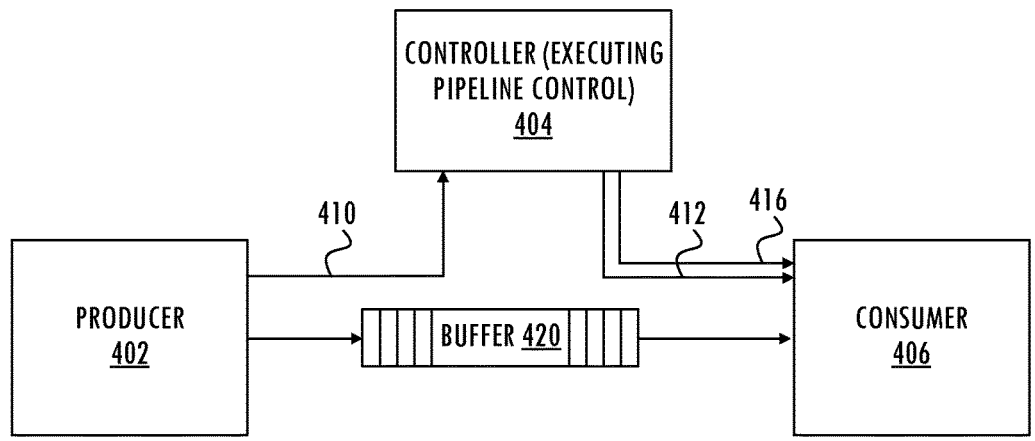
FIG. 4 illustrates a functional block diagram of an exemplary portion of the pipelined video processing system of FIG. 1.

Referring to FIG. 4, in general, a producer execution unit 402 processes data and provides resulting data (e.g., a frame or a portion of a frame of video data) to buffer 420 (e.g., a buffer within an SoC including the producer execution unit 402) or to a buffer in a memory system including storage that is internal or external to the SoC including producer execution unit 402. Controller 404 waits for an indication that producer execution unit 402 has completed its subtask (e.g., processing a frame or a predetermined portion of a frame of video data). For example, upon completion of processing a frame of video data, producer execution unit 402 sets a signal that is polled by controller 404, sets an interrupt line of controller 404, or provides another signal that indicates to controller 404 that producer execution unit 402 has completed its subtask and indicates the availability of the resulting data. In embodiments where buffer 420 is internal to the SoC, in response to writing the last data to buffer 420 (e.g., a last pixel of a last line or last fundamental block of a frame or predetermined portion of a frame of video data), producer execution unit 402 provides command information 410 to controller 404. Exemplary command information 410 may include one or more of filter taps, filter history information, data format information, data compression or decompression information, gain information, frame or portion of frame size information, or other information that may be used to configure a consumer execution unit for processing next data (e.g., a frame or a portion of a frame of video data that was processed by producer execution unit 402).

Controller 404 receives the information and the indication that producer execution unit 402 has completed execution. Controller 404 verifies that consumer execution unit 406 is ready to execute its subtask on next data (e.g., process a next frame or next predetermined portion of a frame of video data produced by a prior execution unit in the pipeline). In response to an indication that consumer execution unit 406 has completed its subtask on prior data and is available to execute its subtask on next data, controller 404 configures consumer execution unit 406 based on command information 410. For example, controller 404 performs register operations that initialize filters by writing data 416 to filter tap registers and filter history information registers, writing to compression or decompression rate information registers, writing to gain control registers, writing to control registers with information regarding length of data, precursor and/or postcursor data buffers, and/or writes other registers associated with a frame or portion of a frame of video data that will be processed by consumer execution unit 406. In at least one embodiment, producer execution unit 402 operates on only a portion of a frame of video data and provides an indicator of the frame boundary to consumer execution unit 406. In addition, controller 404 triggers consumer execution unit 406 to begin execution by generating handshake signal 412.

The functions performed by controller 404 consume processing time and introduce delay into typical pipelined execution. For example, controller 404 may execute other functions and may not immediately detect or handle an indication that producer 402 has completed its subtask. In addition, while configuring consumer 406 for execution, producer 402 may be idle awaiting its own configuration for executing its subtask on next data from controller 404. Similarly, controller 404 may be otherwise disposed and not immediately available to configure consumer execution unit 406 for next execution, leaving consumer execution unit 406 idle. Such delays reduce performance or throughput of the SoC. Accordingly, new techniques for operating pipelined execution units are desired.

Figure 5:
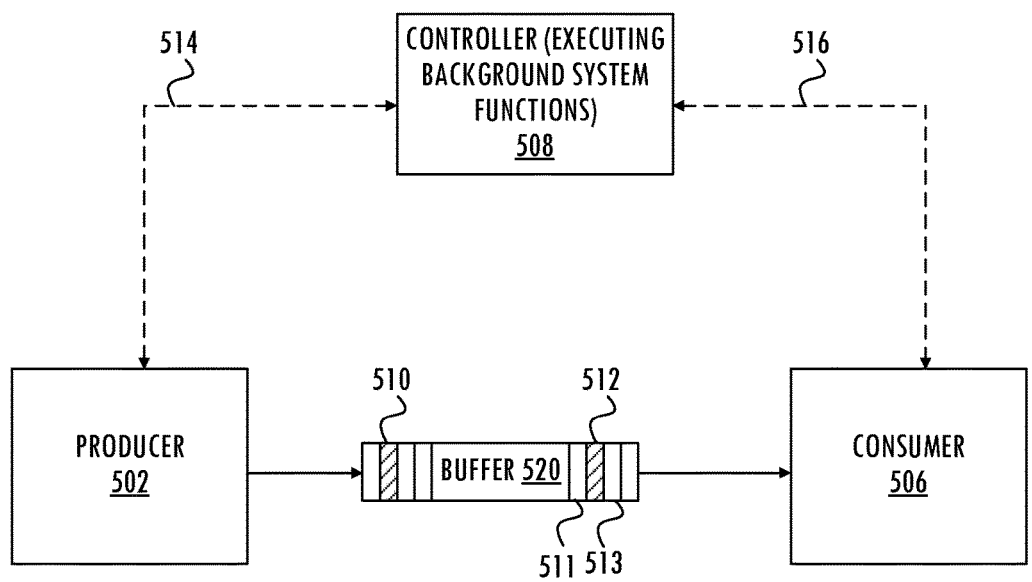
FIG. 5 illustrates a functional block diagram of an exemplary portion of the pipelined video processing system of FIG. 1.

Referring to FIG. 5, a technique for controlling pipelined execution units includes a producer execution unit writing a configuration and start command for a consumer execution unit to an intermediate buffer, thereby bypassing a pipeline controller. By communicating with the consumer execution unit via an intermediate buffer, the technique reduces or eliminates wait states due to the pipeline controller. For example, producer execution unit 502 writes the configuration and trigger information 512, for execution of a consumer of its subtask on next data 511, to the end of data 513 and before writing data 511. In at least one embodiment, producer execution unit 502 writes that configuration and trigger information 512 for execution of a subtask on next data interleaved with the data 513, near the end of data 513. In at least one embodiment, producer execution unit 502 writes configuration information separately from the start command information interleaved among the data for the prior command 513 or at the end of the data for the prior command 513. Configuration and trigger information 512 may include a flag or other indicator for detection by consumer execution unit 506 to trigger execution based thereon. Producer execution unit 502 writes configuration and start command information 510 for execution of the subtask on subsequent data near or at the end of the data 511.

In at least one embodiment, producer execution unit 502 writes frames of video data to buffer 520 in a different order than it is read from buffer 520 by consumer execution unit 506. Producer execution unit 502 may write a frame of video data to buffer 520 in fundamental blocks of pixels and consumer execution unit 506 may read a frame of video data from buffer 520 in complete lines of pixels. Conversely, producer execution unit 502 may write a frame of video data to buffer 520 in complete lines of pixels and consumer execution unit 506 may read the frame of video data from buffer 520 in fundamental blocks of pixels. In at least one embodiment, producer execution unit 502 processes only a portion of a frame of video data at a time and configuration and trigger information 512 includes boundary information to indicate to consumer execution unit 506 which portion of the video frame the data corresponds.

Consumer execution unit 506 knows when it is ready for processing next data (e.g., based on a length of data being processed, reaching a buffer boundary during processing, number of instructions being executed, or other suitable execution information), and can obtain the next configuration and start command from buffer 520 when consumer execution unit 506 is ready for the information. Meanwhile, pipeline controller 508 executes background tasks (e.g., steady state update routines, system characterization, etc.) without delaying operations of the execution units. Controller 508 may provide updates at a suitable time via communications 514 and 516 between pipeline controller 508 and producer execution unit 502 and consumer execution unit 506, respectively. Those communications may include interrupts, writing to a shadow register in the background while consumer execution unit executes a subtask, or other suitable update techniques.

Figure 6:
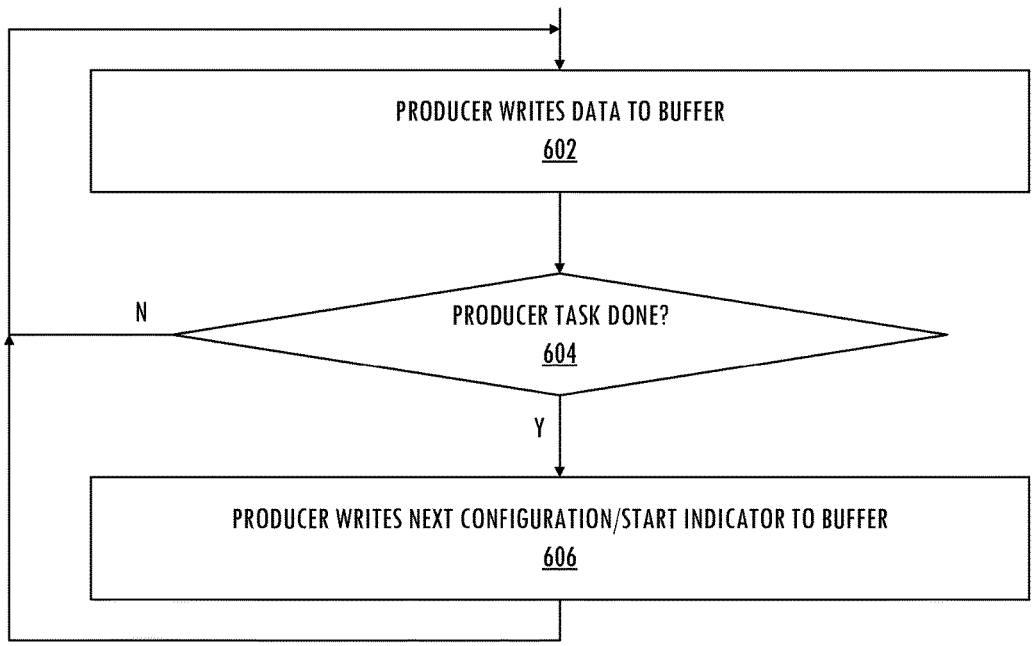
FIG. 6 illustrates exemplary information and control flows for the portion of the pipelined video processing system of FIG. 5 consistent with at least one embodiment of the invention.
Figure 7:
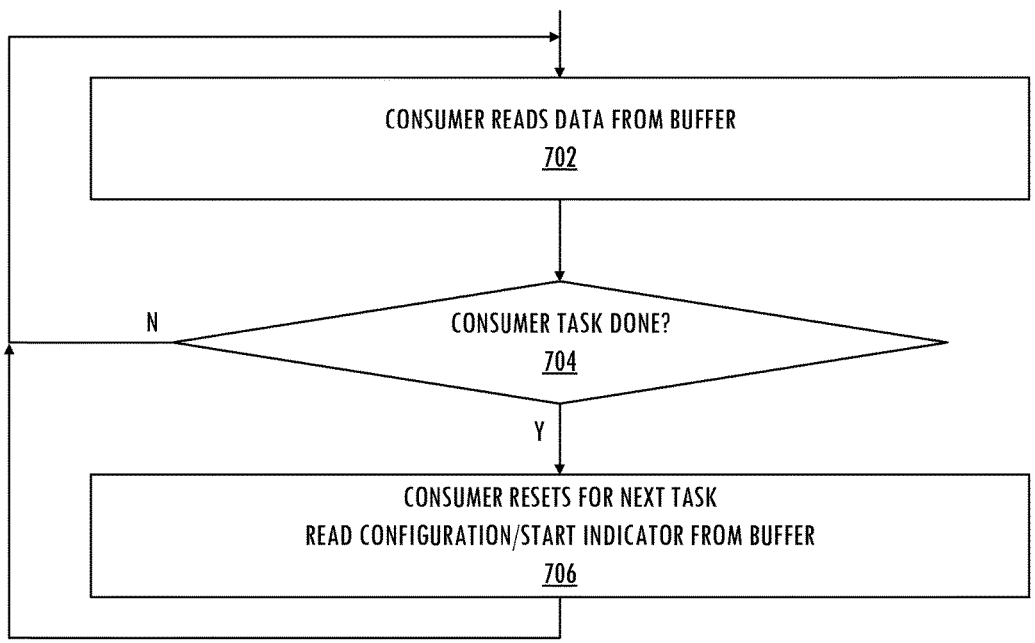
FIG. 7 illustrates exemplary information and control flows for the portion of the pipelined video processing system of FIG. 5 consistent with at least one embodiment of the invention.

Referring to FIGS. 5, 6, and 7, in at least one embodiment, producer execution unit 502 performs a subtask that results in writing data to buffer 520 (602). If the subtask is not complete (604), producer execution unit 502 continues to execute and write data to buffer 520. If producer execution unit 502 has completed its subtask (604), then producer execution unit writes next configuration and trigger information 512 to the buffer, at the end or near the end of data 513 associated with execution of the subtask on prior data (606). Meanwhile, controller 508 executes background tasks (e.g., monitor system progress, gather statistics, characterize steady state parameters for updates to execution units, etc.)

and consumer execution unit 506 executes a subtask in parallel, which may include reading data 513 from buffer 520 for execution of its subtask on data 513 (702).

Data 513 was written by producer execution unit 502 during prior execution of its subtask on prior data. If consumer execution unit 506 has not yet completed its current subtask (704), consumer execution unit 506 continues to execute the consumer subtask (702), which includes reading data 513 from the buffer 520. If consumer execution unit 506 has completed its subtask on data 513 (704), consumer execution unit 506 resets and reads configuration and trigger information 512 from the buffer or otherwise prepares to execute its subtask on data 511 (706). Consumer execution unit 506 configures itself and triggers execution based on next configuration and trigger information 512 read from buffer 520. Meanwhile, controller 508 executes background tasks (e.g., monitor system progress, gather statistics, characterize steady state parameters for updates to execution units, etc.) and producer execution unit 502 executes a subtask in parallel (702). By having producer execution unit 502 provide configuration and control information to consumer execution unit 506 using an intermediate buffer, independent of controller 508, pipeline delay is reduced or eliminated and throughput of video processing system increases as compared to the pipeline technique of FIG. 4.

Thus a technique for controlling pipelined execution units has been described. Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment that processes video data having a particular format, one of skill in the art will appreciate that the teachings herein can be utilized with pipelined processing modules that process other types of data having other formats. Variations and modifications of the embodiments disclosed herein, may be made based on the description set forth herein, without departing from the scope and spirit of the invention as set forth in the following claims.

What is claimed is:

1. A method comprising:
writing first processed data to a buffer, the first processed data being generated in response to execution of a first subtask of a pipelined task on first data;
interleaving command information to an end of the first processed data in the buffer, the command information including configuration information and trigger information associated with execution of a second subtask of the pipelined task on second processed data;
interleaving the second processed data to an end of the command information, the second processed data being generated in response to execution of the first subtask of the pipelined task on second data; and
triggering execution of the second subtask on the second processed data according to the configuration information in response to receiving the trigger information from the buffer at a conclusion of execution of the second subtask on the first processed data.

2. The method, as recited in claim 1, further comprising:
executing the first subtask based on the first data to generate the first processed data.

3. The method, as recited in claim 2, wherein the triggering execution of the second subtask comprises:
triggering execution of an execution unit in response to the trigger information.

4. The method, as recited in claim 1, wherein execution of the second subtask comprises:
configuring an execution unit associated with the second subtask based on the configuration information.

5. The method, as recited in claim 1, wherein the configuration information comprises filter tap information.

6. The method, as recited in claim 1, wherein the configuration information comprises execution unit history information.

7. The method, as recited in claim 1, wherein the configuration information comprises size information associated with the second processed data.

8. The method, as recited in claim 1, wherein the first processed data and the second processed data are associated with adjacent fundamental blocks of a video frame.

9. The method, as recited in claim 1, wherein the configuration information includes boundary information for adjacent fundamental blocks of the video frame.

10. The method, as recited in claim 1, wherein the triggering execution of the second subtask is independent of a pipeline controller.

11. An apparatus comprising:
a first execution unit configured to:
write first processed data to a buffer, the first processed data being generated by execution of a first subtask of a pipelined task on first data to a buffer,
interleave command information associated with execution of a second subtask on second processed data to an end of the first processed data in the buffer, the command information including configuration information and trigger information, and
interleave the second processed data to an end of the command information, the second processed data being generated in response to execution of the first subtask of the pipelined task on second data; and
a second execution unit coupled in series with the first execution unit and configured to execute in parallel with the first execution unit, the second execution unit being further configured to execute a second subtask of the pipelined task on the first processed data and further configured to trigger execution of the second subtask on the second processed data according to the configuration information in response to receiving the trigger information from the buffer at a conclusion of execution of the second subtask on the first processed data.

12. The apparatus, as recited in claim 11, wherein the configuration information comprises filter tap information.

13. The apparatus, as recited in claim 11, wherein the configuration information comprises history information.

14. The apparatus, as recited in claim 11, wherein the configuration information comprises size information associated with the first processed data.

15. The apparatus, as recited in claim 11, wherein the second execution unit is configured to trigger execution of the second subtask in response to the configuration information.

16. The apparatus, as recited in claim 11, further comprising:
the buffer configured to store the first processed data and the trigger information.

17. The apparatus, as recited in claim 11, wherein the first processed data and the second processed data are associated with adjacent fundamental blocks of a video frame and the configuration information includes boundary information for the adjacent fundamental blocks of the video frame.

18. The apparatus, as recited in claim 11, wherein the triggering execution of the second subtask is independent of a pipeline controller coupled to the first execution unit and the second execution unit.

19. An apparatus comprising:
means for generating and storing first processed data in a buffer, the first processed data being provided in response to execution of a first subtask of a pipelined task on first data;
means for generating and storing configuration and trigger information interleaved with an end of the first processed data in the buffer, the configuration information being associated with a second subtask of the pipelined task on second processed data;
means for generating and storing the second processed data interleaved with an end of the configuration and trigger information in the buffer; and
means for executing the second subtask on the second processed data according to the command and trigger information in response to receiving the trigger information from the buffer at a conclusion of execution of the second subtask on the first processed data.

* * * * *